United States Patent [19]
Sukata et al.

[11] Patent Number: 5,843,611
[45] Date of Patent: Dec. 1, 1998

[54] MONOAZO METAL COMPOUND, COMPOSITION THEREOF, CHARGE CONTROL AGENT, TONER AND POWDERY PAINT

[75] Inventors: Kazuaki Sukata, Kyoto; Shuji Sugawara, Osaka; Shun-ichiro Yamanaka, Osaka; Tohru Tsuruhara, Osaka; Masashi Yasumatsu, Osaka, all of Japan

[73] Assignee: Orient Chemical Industries, Ltd., Osaka, Japan

[21] Appl. No.: 733,294

[22] Filed: Oct. 17, 1996

[30] Foreign Application Priority Data

Oct. 20, 1995 [JP] Japan .................................... 7-297414

[51] Int. Cl.⁶ .................................................. G03G 9/097
[52] U.S. Cl. ........................................ 430/110; 106/31.48
[58] Field of Search ........................... 430/106, 109, 430/110; 106/31.48

[56] References Cited

U.S. PATENT DOCUMENTS

| | | | |
|---|---|---|---|
| 4,206,064 | 6/1980 | Kiuchi et al. | 430/110 |
| 4,404,269 | 9/1983 | Miyakawa et al. | 430/110 |
| 4,404,271 | 9/1983 | Kawagishi et al. | 430/110 |
| 4,433,040 | 2/1984 | Niimura et al. | 430/110 |
| 5,376,151 | 12/1994 | Freeman et al. | 8/685 |

FOREIGN PATENT DOCUMENTS

| | | |
|---|---|---|
| 0 141 377 A2 | 10/1984 | European Pat. Off. . |
| 42 27 743 A1 | 2/1994 | Germany . |
| 61-117567 | 4/1986 | Japan . |
| 2 272 702 | 5/1994 | United Kingdom . |

OTHER PUBLICATIONS

Apr. 17, 1985, Japanese Patent Unexamined Publication No. 67563/1985.
Apr. 5, 1988, Japanese Patent Unexamined Publication No. 75077/1988.
Aug. 23, 1990, Japanese Patent Unexamined Publication No. 212563/1990.
Tsuchiya et al., 1989, Current Progress of Mass Analysis (in Japanese), Gendai Kagu Extra Issue 15 (1989), Tokyo Kagaku Dojin.
Mizuno, 1990, FABMS Analysis for Dyes Containing Salts of Aryl Sulfonates, Kagaku to Kogyo, 64, 578,507.
Mizuno et al., 1992, FDMS Analysis of Insoluble Organic Coloring Matters, Kagaku to Kogyo, 66, 569.
Feb. 16, 1984, Japanese Patent Unexamined Publication No. 29254/1984.
Jul. 18, 1987, Japanese Patent Unexamined Publication No. 163061/1987.
The Society of Dyers and Colourists, Colour Index, Third Edition, vol. 5.
M. Muszynski et al., Nov. 17, 1980, Chromium complex 1:2 and 2:3 type dyes in the form of fluid dyeing agents, Chemical Abstracts, vol. 93, No. 20.
Derwent Publications Ltd., Jul. 18, 1987, Negatively–charged electrophotographic . . . , Database WPI Sectin Ch, Week 8734, Only First Page.
Lay K –Y et al., Jan. 1, 1994, Azo Pigment and Their Intermediates . . . , Journal of Imaging Science and Technology, vol. 38, No. 1.

*Primary Examiner*—John Goodrow
*Attorney, Agent, or Firm*—McGlew and Tuttle

[57] ABSTRACT

Monoazo metal compound of formula [I] which is excellent in charge control or charge-enhancing property, and toner for developing electrostatic images and powdery paint for electrostatic painting incorporating thereof:

$$D_3(Met)_2 \qquad [I]$$

D is a ligand based on a monoazo compound of formula [II] or [III], Met is a metal atom, and the 3 molecules of D are coordinated to the 2 atoms of Met:

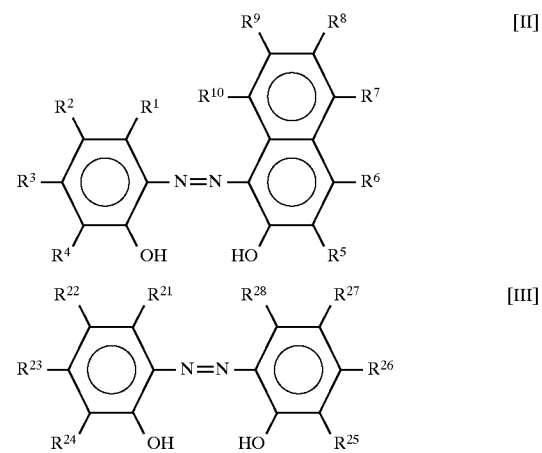

$R^1$–$R^{10}$ and $R^{21}$–$R^{28}$ are each H, halogen, nitro, alkyl or haloalkyl, aryl, aralkyl, —$SO_2N(R^{11})_2$ ($R^{11}$ is H, alkyl, aryl, aralkyl), —$N(R^{12})_2$ ($R^{12}$ is H, lower alkyl, aryl, aralkyl, acyl), —$CONH(R^{13})$ ($R^{13}$ is H, a lower alkyl, aryl, aralkyl); 2 or more of $R^1$–$R^{10}$ and/or $R^{21}$–$R^{28}$ may bind together to form an aromatic or aliphatic ring.

11 Claims, 5 Drawing Sheets

MONOAZO METAL COMPOUND, COMPOSITION THEREOF, CHARGE CONTROL AGENT, TONER AND POWDERY PAINT

BACKGROUND OF THE INVENTION

1. Field of the Invention

The present invention relates to a monoazo metal compound, a composition comprising a monoazo metal compound, a toner for developing electrostatic images, a charge control agent for controlling or stabilizing the amount of charges of said toner, a powdery paint for electrostatic painting and a charge enhancer for enhancing the charge of said powdery paint.

2. Description of the Prior Art

In copying machines, printers and other instruments based on electrophotography, various toners containing a coloring agent, a fixing resin and other substances are used to visualize the electrostatic latent image formed on the photoreceptor having a light-sensitive layer containing an inorganic or organic photoconductive substance.

Toner chargeability is a key factor in electrostatic latent image-developing systems. Thus, to appropriately control or stabilize the amount of toner charge, a charge control agent providing a positive or negative charge is often added to the toner.

Of the conventional charge control agents in actual application, those providing a positive charge for a toner include basic dyes such as nigrosine dyes and triarylmethane dyes, and quaternary ammonium salts, i.e. electron donors. Charge control agents providing a negative charge for a toner include 2:1 type metal complexes of azo dyes and metal complexes of aromatic hydroxycarboxylic acids such as alkylsalicylic acids.

However, most metal complexes of azo dye structure used as charge control agents are usually unstable; for example, they are likely to be decomposed or deteriorated to lose their expected charge control capability when exposed to mechanical friction or impact, temperature or humidity changes, electric impact, light irradiation, etc. Also, even such metal complexes possessing a practically applicable charge providing property are often problematic as to charge stability or often contain impurity chemicals lacking charge control effect due to differences in production method etc., posing many problems regarding quality stability, reliability and other aspects.

Also, to improve paint adhesion efficiency in electrostatic powder painting, there have been attempts to apply charge control agents that have traditionally been used to control or enhance the charge of toners for developing electrostatic images.

Such attempts include an electrostatic powdery paint containing a resin polymer of an azine dye [Japanese Patent Unexamined Publication No. 67563/1985], a resin powder composition for electrostatic painting containing a charge enhancer like a metal-containing complex salt compound (Japanese Patent Unexamined Publication No. 75077/1988), and a powdery paint composition containing a quaternary ammonium salt as a charge control agent or charge enhancer (Japanese Patent Unexamined Publication No. 212563/1990).

However, these electrostatic powdery paints remain to be further improved in terms of environmental stability and heat resistance and durability under high-temperature conditions during powder painting.

Among charge control agents or charge enhancers capable of resolving these problems are the metal complex salt compounds of monoazo dyes, having the following structures:

wherein A represents H, an alkali metal, an amine or the like.

Such chromium complex salt dyes are what is called 2:1 type azo-metal complex salt dyes wherein 2 molecules of a monoazo dye are coordinated to 1 trivalent chromium atom, and remain to be further improved as to chargeability stability and reliability.

The object of the present invention is to provide a metal compound of new chemical structure excellent in charge control or charge-enhancing property, heat resistance and light fastness; a charge control agent or charge enhancer that contains said metal compound as an active ingredient, that is good in dispersibility in resin and excellent in environmental resistance (stability of charge control or charge-enhancing property to changes in temperature or humidity), storage stability (stability over time of charge control or charge-enhancing property) and durability (charge control or charge-enhancing property stability in frequently repeated use), and that does not affect toner fixability or offset property when used in toners; and a toner for developing electrostatic images and powdery paint for electrostatic painting of stable quality and high reliability.

SUMMARY OF THE INVENTION

A monoazo metal compound of the present invention, wherein 3 molecules of a monoazo compound having 2 metallizable —OH groups represented by formula [II] or [III] below are coordinated to 2 metal atoms (Met), is represented by the formula:

$$D_3(Met)_2 \qquad [I]$$

wherein D represents a ligand based on a monoazo compound:

wherein $R^1$, $R^2$, $R^3$, $R^4$, $R^5$, $R^6$, $R^7$, $R^8$, $R^9$ and $R^{10}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{11})_2$ (Each of the two $R^{11}$ groups represents a hydrogen, a lower alkyl group, an aryl group having or not having nuclear substitution, or an aralkyl group having or not having nuclear substitution. The two $R^{11}$ groups may be identical or not.), —$N(R^{12})_2$ (Each of the two $R^{12}$ groups represent a hydrogen, a lower alkyl group, an aryl group having or not having nuclear substitution, an aralkyl group having or not having nuclear substitution, or an acyl group. The two $R^{12}$ groups may be identical or not.), or —$CONH(R^{13})$ ($R^{13}$ represents a hydrogen, a lower alkyl group, an aryl group having or not having nuclear substitution, or an aralkyl group having or not having nuclear substitution); 2 or more of $R^1$ through $R^{10}$ may bind together to form an aromatic or aliphatic ring, and wherein $R_{21}$, $R^{22}$, $R^{23}$, $R^{24}$, $R^{25}$, $R^{26}$, $R^{27}$, and $R^{28}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{29})_2$ (Each of the two $R^{29}$ groups represent a hydrogen, a lower alkyl group, an aryl group having or not having nuclear substitution, or an aralkyl group having or not having nuclear substitution. The two $R^{29}$ groups may be identical or not.), —$N(R^{30})_2$ (Each of the two $R^{30}$ groups represent a hydrogen, a lower alkyl group, an aryl group having or not having nuclear substitution, an aralkyl group having or not having nuclear substitution, or an acyl group. The two $R^{30}$ groups may be identical or not.), or —$CONH(R^{31})$ ($R^{31}$ represents a hydrogen, a lower alkyl group, an aryl group having or not having nuclear substitution, or an aralkyl group having or not having nuclear substitution); 2 or more of $R^{21}$ through $R^{28}$ may bind together to form an aromatic or aliphatic ring.

Another monoazo metal compound of the present invention, wherein 6 molecules of a monoazo compound having 2 metallizable —OH groups represented by formula [II] or [III] above are coordinated to 4 metal atoms (Met), is represented by the formula:

$$D_6(Met)_4 \qquad [IV]$$

wherein D represents a ligand based on a monoazo compound.

A composition of the present invention comprises 2 or 3 monoazo metal compounds selected from the group consisting of monoazo metal compounds represented by formula [VI] below, monoazo metal compounds represented by formula [VII] below, and monoazo metal compounds represented by formula [VIII] below:

In formulas [VI], [VII] and [VIII], $R^1$ through $R^{10}$ have the same definitions as those given above; 2 or more of $R^1$ through $R^{10}$ may bind together to form an aromatic or aliphatic ring.

In formula [VIII], $A^+$ represents a cation.

Another composition of the present invention comprises 2 or 3 monoazo metal compounds selected from the group consisting of monoazo metal compounds represented by formula [IX] below, monoazo metal compounds represented by formula [X] below, and monoazo metal compounds represented by formula [XI] below:

In formulas [IX], [X] and [XI], $R^{21}$ through $R^{28}$ have the same definitions as those given above; 2 or more of $R^{21}$ through $R^{28}$ may bind together to form an aromatic or aliphatic ring.

In formula [XI], $A^+$ represents a cation.

The charge control agent of the present invention, which is a charge control agent for controlling or stabilizing the chargeability of a toner for developing electrostatic images, contains an above-described monoazo metal compound of the present invention or an above-described composition of the present invention as an active ingredient.

The toner of the present invention for developing electrostatic images comprises an above-described monoazo metal compound of the present invention or an above-described composition of the present invention as a charge control agent, a coloring agent and a resin. The toner may comprise a single monoazo metal compound of the present invention or a plurality of monoazo metal compounds of the present invention.

The charge enhancer of the present invention, which is a charge enhancer for controlling or enhancing the amount of charges of a powdery paint for electrostatic painting, contains an above-described monoazo metal compound of the present invention or an above-described composition of the present invention as an active ingredient.

Also, the powdery paint of the present invention for electrostatic painting comprises an above-described monoazo metal compound of the present invention or an above-described composition of the present invention as a charge enhancer and a resin.

The monoazo metal compounds of the present invention and the compositions comprising them are excellent in heat resistance and light fastness because of their chemical binding property.

The charge control agent and charge enhancer containing a monoazo metal compound of the present invention as an active ingredient, and the charge control agent and charge enhancer containing a composition comprising a monoazo metal compound of the present invention as an active ingredient are good in dispersibility in resin and excellent in chargeability controlling or stabilizing property or charge amount controlling or enhancing property, environmental resistance, storage stability and durability, and do not affect toner fixability or offset property when used in toners.

Containing an above-described monoazo metal compound of the present invention or an above-described composition of the present invention as a charge control agent, the toner of the present invention for developing electrostatic images is excellent in chargeability, environmental resistance, storage stability and durability, good in fixability and offset property, capable of forming toner images of high quality, and highly reliable in terms of product quality stability.

Containing an above-described monoazo metal compound of the present invention or an above-described composition of the present invention as a charge enhancer, the powdery paint of the present invention for electrostatic painting is excellent in chargeability, environmental resistance, storage stability, durability and painting adhesion efficiency, capable of forming a paint film of high quality, and highly reliable in terms of product quality stability.

DETAILED DESCRIPTION OF THE INVENTION

The monoazo metal compound represented by formula [VI] or [IX] is identical to the monoazo metal compound represented by formula [I] ($D_3(Met)_2$); the monoazo metal compound represented by formula [VII] or [X] is identical to the monoazo metal compound represented by formula [IV] ($D_6(Met)_4$). The monoazo metal compound represented by formula [VIII] or [XI] is identical to the monoazo metal compound represented by the formula:

$$[D_2(Met)]^-.A^+ \qquad [XII]$$

wherein D represents a ligand based on a monoazo compound; $A^+$ represents a cation.

With respect to the above-described monoazo metal compounds, the metal atom (Met) is exemplified by trivalent atoms of metals such as chromium, iron and aluminum, and cobalt and nickel, with preference given to trivalent chromium, trivalent iron, and trivalent aluminum.

With respect to the above-described monoazo metal compounds, the substituents $R^1$ through $R^{10}$ and $R^{21}$ through $R^{28}$ are exemplified by:

hydrogen [H];

halogens such as Cl, Br, I and F;

nitro groups;

alkyl groups having 1 to 20 carbon atoms or haloalkyl groups having 1 to 20 carbon atoms, such as methyl, ethyl, n-propyl, isopropyl, n-butyl, isobutyl, sec-butyl, tert-butyl, n-octyl, tert-octyl, 2-ethylhexyl, n-decyl and dodecyl, preferably alkyl groups having 1 to 12 carbon atoms or haloalkyl groups such as the trifluoromethyl group;

aralkyl groups (including those subjected to nuclear substitution with lower alkyl groups etc.) such as benzyl, benzyls substituted by lower alkyls (the term "lower alkyl" as used herein means an alkyl having 1 to 4 carbon atoms), phenylethyl, phenylpropyl, naphthylmethyl and naphthylethyl; aryl groups (including those subjected to nuclear substitution with lower alkyl groups or halogens) such as phenyl, naphthyl, phenyls substituted by lower alkyls, naphthyls substituted by lower alkyls, halogenated phenyls and halogenated naphthyls; $-SO_2N(R^{11})_2$ groups and $-SO_2N(R^{29})_2$ groups such as $-SO_2NH_2$, $-SO_2 N(alkyl)_2$, $-SO_2NH(phenyl)$ and $-SO_2NH$ (benzyl) [$R^{11}$ and $R^{29}$ independently represent a hydrogen, a lower alkyl group, an aryl group (including aryl groups subjected to nuclear substitution with lower alkyl groups or halogens) or an aralkyl group (including aralkyl groups subjected to nuclear substitution with lower alkyl groups etc.)];

—N(R$^{12}$)$_2$ groups and —N(R$^{30}$)$_2$ groups such as —NH$_2$, —N(alkyl)$_2$, —NH(phenyl), —NH(benzyl) and —NH(acetyl) [R$^{12}$ and R$^{30}$ independently represent a hydrogen, a lower alkyl group, an aryl group (including aryl groups subjected to nuclear substitution with lower alkyl groups or halogens), an aralkyl group (including aralkyl groups subjected to nuclear substitution with lower alkyl groups etc.), or an acyl group]; and —CONH(R$^{13}$) groups and —CONH(R$^{31}$) groups such as —CONH$_2$, —CONH(alkyl), —CONH(phenyl) and —CONH(benzyl) [R$^{13}$ and R$^{31}$ independently represent a hydrogen, a lower alkyl group, an aryl group (including aryl groups subjected to nuclear substitution with lower alkyl groups or halogens) or an aralkyl group (including aralkyl groups subjected to nuclear substitution with lower alkyl groups etc.)].

With respect to R$^1$ through R$^4$ above, it is preferable that 1 or 2 thereof be Cl or nitro groups (if two are such, they may be identical or not), because a good charge-providing property is obtained. The same applies to R$^{21}$ through R$^{24}$.

As R$^5$ and R$^{25}$ above, hydrogen [H] or an amide group represented by formula [V] below is preferred:

[V]

wherein (R$^{14}$)0–2 means 0 to 2 substituents; R$^{14}$ represents a halogen such as Cl, Br, I or F, a lower alkyl group such as methyl or ethyl, or an alkoxy group having 1 to 4 carbon atoms, such as methoxy or ethoxy.

As R$^6$ through R$^{10}$ and R$^{26}$ through R$^{28}$ above, hydrogen [H]; halogens such as Cl, Br, I and F; alkyl groups having 1 to 20 carbon atoms or haloalkyl groups having 1 to 12 carbon atoms, such as methyl, ethyl, propyl, isopropyl, butyl, sec-butyl, tert-butyl, amyl, octyl, tert-octyl and dodecyl; and —N(R$^{12}$)$_2$ and —N(R$^{30}$)$_2$ groups such as —NH$_2$, —N(alkyl)$_2$, —NH(phenyl), —NH(benzyl), —NH(acetyl) and —NH(benzoyl) are preferred. More preferably, R$^6$ through R$^{10}$ or R$^{26}$ through R$^{28}$ are all hydrogen [H], or 1 or 2 of R$^6$ through R$^{10}$ are halogens, alkyls or —N(R$^{12}$)$_2$ (if two are such, they may be identical or not) and 1 or 2 of R$^{26}$ through R$^{28}$ are halogens, alkyls or —N(R$^{30}$)$_2$ (if two are such, they may be identical or not).

With respect to formulas [VIII], [XI] and [XII], A$^+$ is exemplified by cations such as H$^+$, alkali metal ions, NH$_4^+$ and organic amine ammonium.

The monoazo compound corresponding to the ligand D in each of the above monoazo metal compounds is exemplified by, but not limited to, the following example monoazo compounds (1) through (19):

(1)

(2)

(3)

(4)

(5)

(6)

(7)

(8)

A metallizable monoazo compound represented by formula [II] or [III] can be obtained by diazotization coupling reaction.

A monoazo metal compound of the present invention and a composition of the present invention can be obtained by reacting a metallizable monoazo compound represented by formula [II] or [III] with a metallizing agent in water and/or organic solvent (preferably in an organic solvent).

Generally, the reaction product formed in an organic solvent can be separated by dispersing it in an appropriate amount of water, collecting the resulting precipitate by filtration, washing it with water, and drying it.

Organic solvents useful for the above-described metallizing reaction include water-soluble organic solvents, including alcohol-series, ether-series and glycol-series organic solvents such as
methanol,
ethanol,
ethylene glycol monomethyl ether,
ethylene glycol monoethyl ether,
propylene glycol monomethyl ether,
ethylene glycol dimethyl ether (monoglyme),
diethylene glycol dimethyl ether (diglyme),
ethylene glycol diethyl ether,
triethylene glycol dimethyl ether (triglyme), tetraethylene glycol dimethyl ether (tetraglyme),
ethylene glycol and
propylene glycol;
and aprotic polar solvents such as
N,N-dimethylformamide,
N,N-dimethylacetamide,
N-methyl-2-pyrrolidone and
dimethyl sulfoxide. The preferable solvents are ethylene glycol monomethyl ether (methyl cellosolve), ethylene glycol monoethyl ether (ethyl cellosolve) and ethylene glycol.

The amount of organic solvent used, not subject to limitation, is normally 2 to 5 parts by weight per part by weight of the monoazo compound (dye) used as the ligand.

Preferable metallizing agents include chromium compounds such as chromium formate, chromium sulfate, chromium chloride and chromium nitrate; iron compounds such as ferric chloride, ferric sulfate and ferric nitrate; and aluminum compounds such as aluminum sulfate and basic aluminum acetate.

The amount of metallizing agent used is normally 1/3 to 2 atomic equivalents, preferably 1/2 to 2/3 atomic equivalents per mol of the monoazo dye used as the ligand.

Isolation of reaction products was difficult even when various chromatographies were attempted. With this in mind, the FD-MS technique, known to preferentially demonstrate molecular ion peaks, was used to detect monoazo metal compounds of the present invention.

Generally, the reaction product obtained by the above-described metallizing reaction contains as major components a 3:2 type monoazo metal compound represented by formula [I] ($D_3$ (Met)$_2$) and a 6:4 type monoazo metal compound represented by formula [IV] ($D_6$(Met)$_4$); however, FD-MS spectral analysis demonstrated that the reaction product also contains small amounts of a 2:1 type monoazo metal compound represented by formula [XII] ($[D_2(Met)]^- A^+$) and other substances.

Because the FD (field desorption)—MS technique is an soft ionization method, fragmentation is unlikely and a simple spectrum is obtained, resulting in the preferential demonstration of molecular ion peaks [Tsuchiya et al., "Current Progress of Mass Analysis" (in Japanese), Gendai Kagaku Extra Issue 15 (1989), Tokyo Kagaku Dojin; Mizuno, Kagaku to Kogyo, 64, 578, 507 (1990); Mizuno et al., Kagaku to Kogyo, 66, 569 (1992)].

The chemical structures of the 3:2 type monoazo metal compound of the present invention, represented by formula [I] ($D_3$(Met)$_2$), and the 6:4 type monoazo metal compound of the present invention, represented by formula [IV] ($D_6$(Met)$_4$), can be respectively shown by molecular structures (i) or (ii) and (iii) or (iv) below. These molecular models, deduced from molecular weight data obtained by FD-MS spectral analysis, were shown to be possible by chemical bond analysis based on the molecular orbital theory.

(i)

(ii)

(iii)

The monoazo metal compounds of the present invention represented by formulas [I] ($D_3$(Met)$_2$) and [IV] ($D_6$(Met)$_4$) are exemplified by compounds (a) through (c) below. With respect to these example compounds, the molecular weight range was estimated in consideration of Cl isotopes.

(a)

Molecular weight:
[$C_{48}H_{27}N_6O_6Cl_3Cr_2$] = 992–998

The toner of the present invention for developing electrostatic images and the powdery paint of the present invention for electrostatic painting may incorporate various dyes and pigments as coloring agents. Examples of useful coloring agents include organic pigments such as Quinophthalone Yellow, Isoindolinone Yellow, Perinone Orange, Perinone Red, Perylene Maroon, Rhodamine 6G Lake, Quinacridone Red, Anthanthron Red, Rose Bengale, copper Phthalocyanine Blue, copper Phthalocyanine Green and diketopyrrolopyrrole pigments; and inorganic pigments and metal powders such as Carbon Black, Titanium White, Titanium Yellow, Ultramarine, Cobalt Blue, Red Iron Oxide, aluminum powder and bronze.

Examples of resins useful in the toner and powdery paint of the present invention include the following resins. Specifically, useful resins for toners include thermoplastic resins such as styrene resin, styrene-acrylic resin, styrene-butadiene resin, styrene-maleic acid resin, styrene-vinyl methyl ether resin, styrene-methacrylic acid ester copolymer, polyester resin and polypropylene resin; useful resins for paints include thermoplastic resins of the acryl-, polyolefin-, polyester-, polyamide- or other series, and thermosetting resins of the phenol-, epoxy-, polyester- or other series.

These resins may be used singly or in blends.

With respect to the toner of the present invention for developing electrostatic images and the powdery paint of the present invention for electrostatic painting, it is preferable that an above-described monoazo metal compound of the present invention or an above-described composition of the present invention be incorporated as a charge control agent or charge enhancer in a ratio of 0.1 to 10 parts by weight per 100 parts by weight of resin. More preferably, the content ratio of charge control agent or charge enhancer is 0.5 to 5 parts by weight per 100 parts by weight of resin.

The toner of the present invention for developing electrostatic images can, for example, be produced as follows:

After a resin and coloring agent (preferably Carbon Black) as described above, an above-described monoazo metal compound of the present invention or an above-described composition of the present invention as a charge control agent, and, if necessary, a magnetic material, a fluidizing agent, a releasing agent and other additives, are thoroughly mixed using a ball mill or another mechanical mixer, the mixture is kneaded in a molten state using a hot kneader such as a heat roll, kneader or extruder. The resulting molten mixture is cooled and solidified, followed by pulverization and particle classification by size, to yield a toner 5 to 20 μm in mean particle diameter.

Other usable methods include the method in which other starting materials are dispersed in a binder resin solution for toners and then spray dried to yield a toner, and the method in which a given set of starting materials are mixed in a monomer for toner binder resin to yield an emulsified suspension, which is then polymerized to yield a polymeric toner.

When the toner of the present invention is used as a two-component developer, development can be achieved by the two-component magnetic brush developing process or the like using the toner of the present invention in mixture with carrier powder.

Any known carrier can be used. Examples of the carrier include iron powder, nickel powder, ferrite powder and glass beads about 50 to 200 μg m in particle diameter, and such materials as coated with acrylic acid ester copolymer, styrene-acrylic acid ester copolymer, styrene-methacrylic acid ester copolymer, silicone resin, polyamide resin, ethylene fluoride resin or the like.

When the toner of the present invention is used as a one-component developer, an appropriate amount of fine powder of a ferromagnetic material such as iron powder, nickel powder or ferrite powder may be added and dispersed in preparing the toner as described above. Examples of developing processes which can be used in this case include contact development and jumping development.

The powdery paint of the present invention for electrostatic painting may be colored by, for example, the addition of a pigment, and may incorporate a filler such as Titanium White, talc, kaolin, silica, alumina, calcium carbonate, aluminum sulfate, barium sulfate, calcium sulfate, titanium oxide or calcium phosphate.

Painting with the powdery paint of the present invention for electrostatic painting can be achieved using an ordinary method of electrostatic powder painting such as the corona charging method, frictional charging method or hybrid method, and permits efficient obtainment of features of powdery paint, such as i) capability of forming a thick coating film without film defects, ii) improvement of coating film performance, and iii) absence of painting loss during painting operation.

EXAMPLES

The present invention is hereinafter described in more detail by means of the following examples, which are not to be construed as limitative on the present invention. In the description given below, figures for part(s) by weight are simply referred to as part(s).

Example 1

To 620 g of ethyl cellosolve and 380 g of ethylene glycol, 110 g (0.59 mol) of chromium (III) formate was added; this mixture was stirred at 80° C. for 1 hour.

To this mixture, 415 g (1.39 mol) of monoazo compound (1) was added; after the temperature was raised to 125° C., the mixture was stirred for 4 hours.

This reaction mixture was dispersed in 4000 ml of a 3% aqueous solution of hydrochloric acid and stirred at 60° C. for 1 hour, after which this mixture was filtered; the cake filtered out was washed with warm water and dried to yield 400 g of a purple powder.

Figure 1:
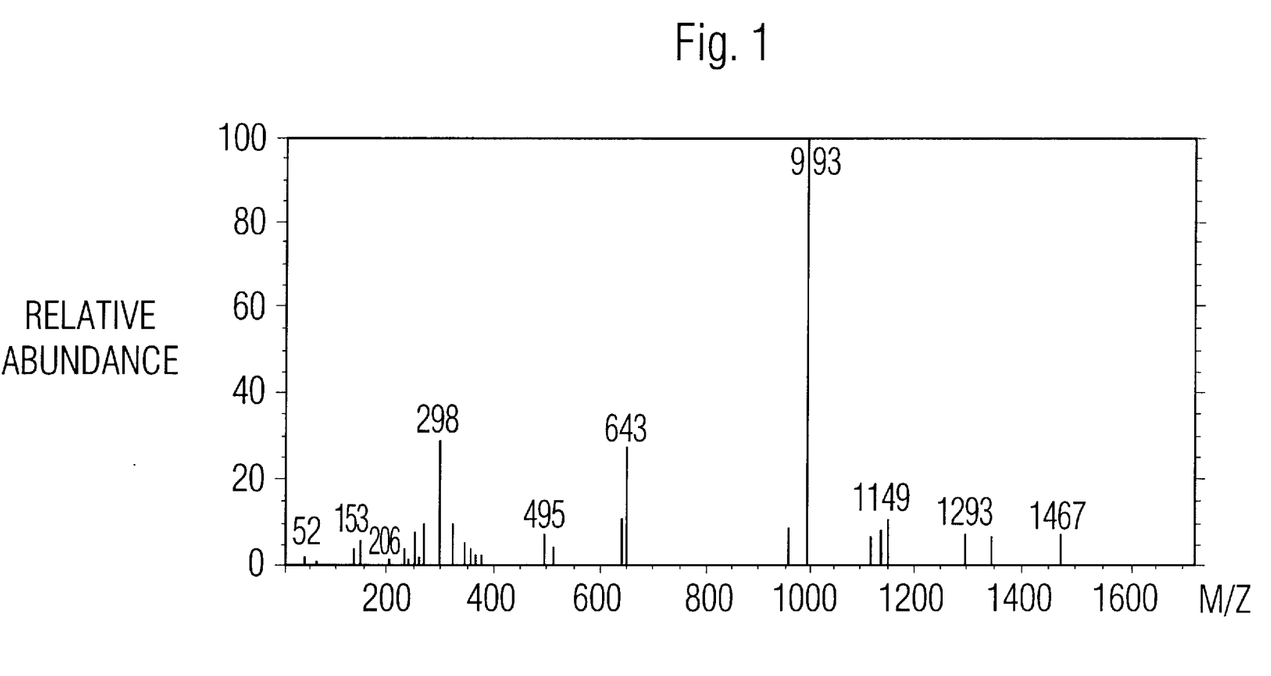
FIG. 1 is an FD-MS spectrum of the composition obtained in Example 1.

This powder was subjected to molecular weight determination by the FD-MS technique; the mass spectrum shown in FIG. 1 was obtained [the abscissa indicates M/Z (mass/charge) and the ordinate indicates relative abundance (content ratio); the same applies to FIGS. 2 through 5].

The mass spectrum of FIG. 1 identified a 3:2 type metal compound of the present invention (example monoazo metal compound (a)) [M/Z, 993 ($M^+$)], which is the major reaction product, a 2:1 type metal compound ({[example monoazo compound (1)]$_2$(Cr)}$^-$·$H^+$) [M/Z, 643 ($M^+$–2)], and unreacted example monoazo compound (1) [M/Z, 298 ($M^+$)].

Molecular weight determination by the FD-MS technique was conducted as follows (the same applies to the Examples below).

The sample, dissolved or dispersed in DMF, was analyzed using a mass analyzer [JMS-DX303HF (trade name), produced by JEOL Ltd.] to obtain a mass spectrum showing the sample's molecular weight.

Analytical conditions A: FD-MS (Field Desorption Mass Spectroscopy) technique (field leaving ionization method) —Carbon emitter used Resolution: 1500, 35–2200 M/Z Acceleration voltage: 2.5 kV Ion multiplier: 1.5–2.5 kV Emitter amperage: 0–40 mA Cathode voltage: 5.0 kV Example 2

82 g (0.6 mol) of salicylic acid was dissolved in 500 g of a 16% aqueous solution of sodium hydroxide; after the temperature was raised to 60° C., 470 g of a 13.4% aqueous solution of iron (III) chloride was added little by little, followed by stirring for 20 minutes to achieve dissolution.

The resulting solution was added to a solution of 150 g (0.5 mol) of example monoazo compound (1) in a 4% aqueous solution of sodium hydroxide; after the temperature was raised to 100° C., the mixture was stirred for 2 hours, after which 65.9 g of a 37% aqueous solution of iron (III) chloride was added, followed by stirring for 1.5 hours.

This reaction mixture was dispersed in 2500 ml of a 1.5% aqueous solution of hydrochloric acid and stirred at 60° C. for 10 minutes, after which the mixture was filtered; the cake filtered out was washed with 2000 ml of hot water and dried to yield 182 g of a black powder.

Figure 2:
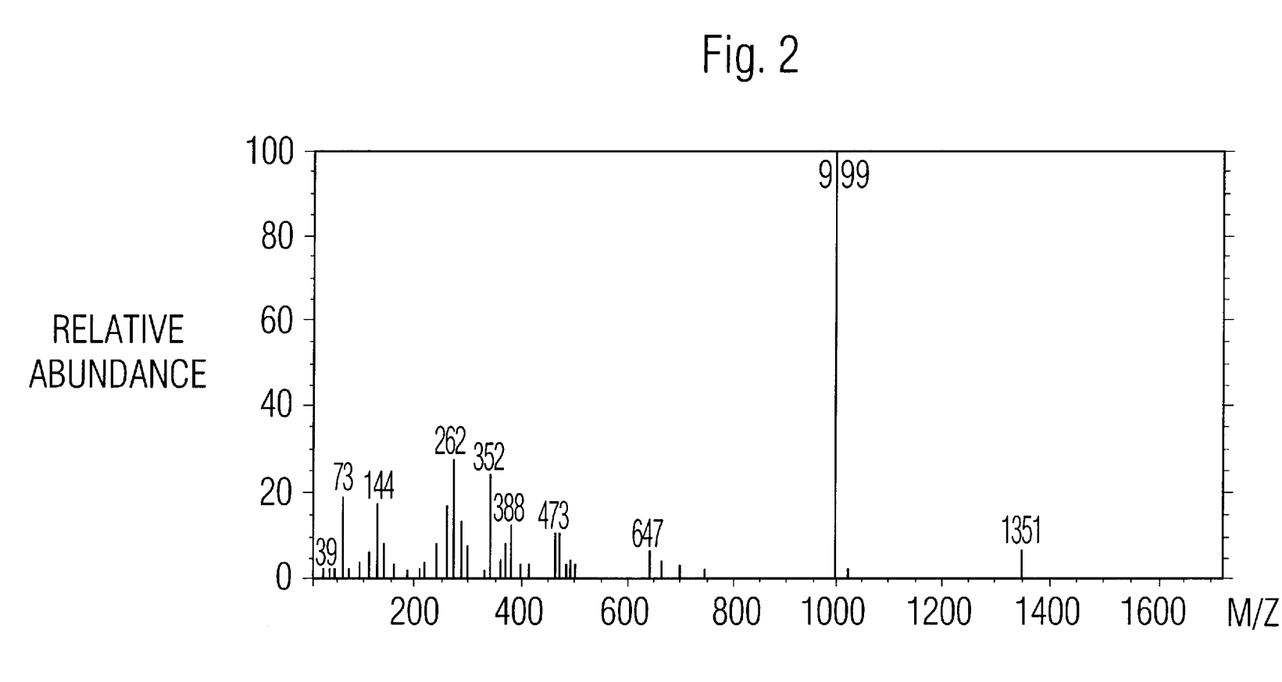
FIG. 2 is an FD-MS spectrum of the composition obtained in Example 2.

This powder was subjected to molecular weight determination by the FD-MS technique; the mass spectrum shown in FIG. 2 was obtained.

The mass spectrum of FIG. 2 identified a 3:2 type metal compound of the present invention (example monoazo metal compound (d)) [M/Z, 999 (M$^+$-1)], which is the major reaction product, and a small amount of a 2:1 type metal compound ({[example monoazo compound (1)]$_2$(Fe)}$^-$.H$^+$) [M/Z, 647 (M$^+$-2)].

Example 3

82 g (0.6 mol) of salicylic acid was dissolved in 500 g of a 16% aqueous solution of sodium hydroxide; after the temperature was raised to 60° C., 470 g of a 13.4% aqueous solution of iron (III) chloride was added little by little, followed by stirring for 20 minutes to achieve dissolution.

The resulting solution was added to a solution of 150 g (0.5 mol) of example monoazo compound (1) in a 4% aqueous solution of sodium hydroxide; after the temperature was raised to 100° C., the mixture was stirred for 4 hours.

This reaction mixture was dispersed in 2500 ml of a 1.5% aqueous solution of hydrochloric acid and stirred at 60° C. for 10 minutes, after which the mixture was filtered; the cake filtered out was washed with 2000 ml of hot water and dried to yield 147 g of a black powder.

Figure 3:
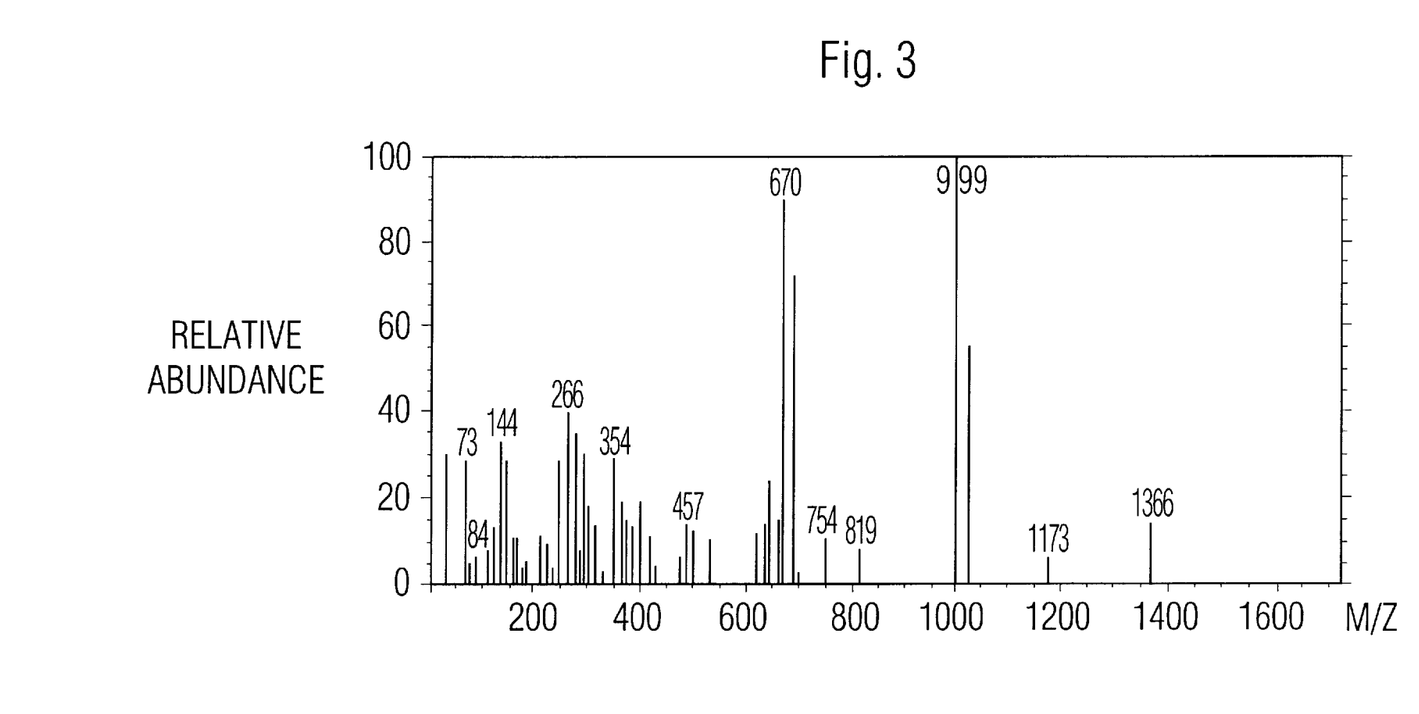
FIG. 3 is an FD-MS spectrum of the composition obtained in Example 3.

This powder was subjected to molecular weight determination by the FD-MS technique; the mass spectrum shown in FIG. 3 was obtained.

The mass spectrum of FIG. 3 identified a 3:2 type metal compound of the present invention (example monoazo metal compound (d)) [M/Z, 999 (M$^+$-1)] and a 2:1 type metal compound ({[example monoazo compound (1)]$_2$(Fe)}$^-$.Na$^+$) [M/Z, 670 (M$^+$-1)] in an almost 1:1 ratio.

Example 4

82 g (0.6 mol) of salicylic acid was dissolved in 500 g of a 16% aqueous solution of sodium hydroxide; after the temperature was raised to 60° C., 470 g of a 13.4% aqueous solution of iron (III) chloride was added little by little, followed by stirring for 20 minutes to achieve dissolution.

The resulting solution was added to a solution of 209 g (0.5 mol) of example monoazo compound (11) in a 4% aqueous solution of sodium hydroxide; after the temperature was raised to 100° C., the mixture was stirred for 2 hours.

This reaction mixture was dispersed in 2500 ml of a 1.5% aqueous solution of hydrochloric acid and stirred at 60° C. for 10 minutes, after which the mixture was filtered; the cake filtered out was washed with 2000 ml of hot water and dried to yield 176 g of a black powder.

Figure 4:
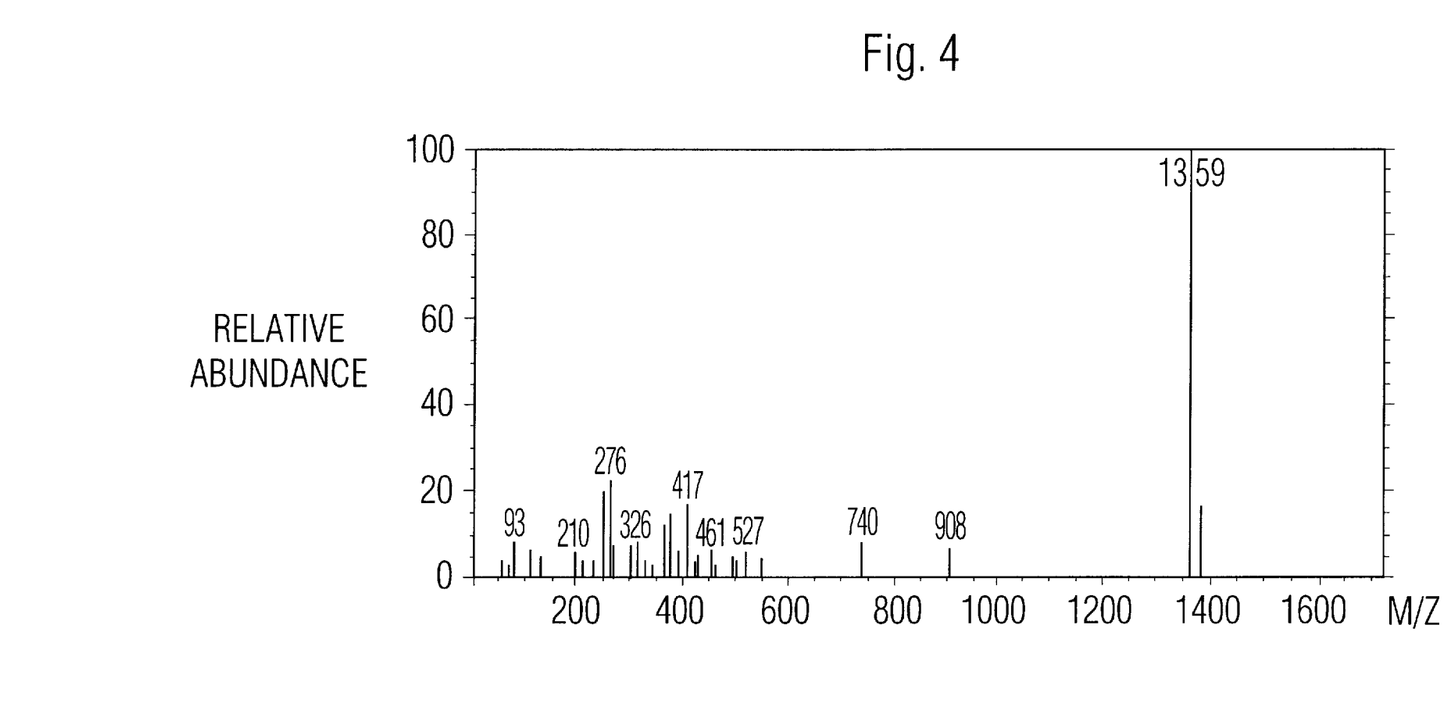
FIG. 4 is an FD-MS spectrum of the composition obtained in Example 4.

This powder was subjected to molecular weight determination by the FD-MS technique; the mass spectrum shown in FIG. 4 was obtained.

The mass spectrum of FIG. 4 identified a 3:2 type metal compound of the present invention (example monoazo metal compound (e)) [M/Z, 1359 (M$^+$)], which is the major reaction product.

Example 5

To 228 g (0.76 mol) of example monoazo compound (1), 340 g of ethyl cellosolve and 220 g of ethylene glycol, a mixture of 76.0 g (0.41 mol) of chromium (III) formate and 24 g of urea was added; this mixture was stirred at 130° C. for 3 hours.

This reaction mixture was filtered while it remained hot; the filtrate was dispersed in an aqueous solution consisting of 30 g of 35% hydrochloric acid and 2000 ml of water, followed by stirring at 50° to 60° C. for about 30 minutes, after which the mixture was filtered; the cake filtered out was washed with water and dried to yield 220 g of a blackish purple powder.

81 g of the powder obtained was washed with a methanol using Soxhlet extractor and dried to yield 71 g of a blackish brown powder.

Figure 5:
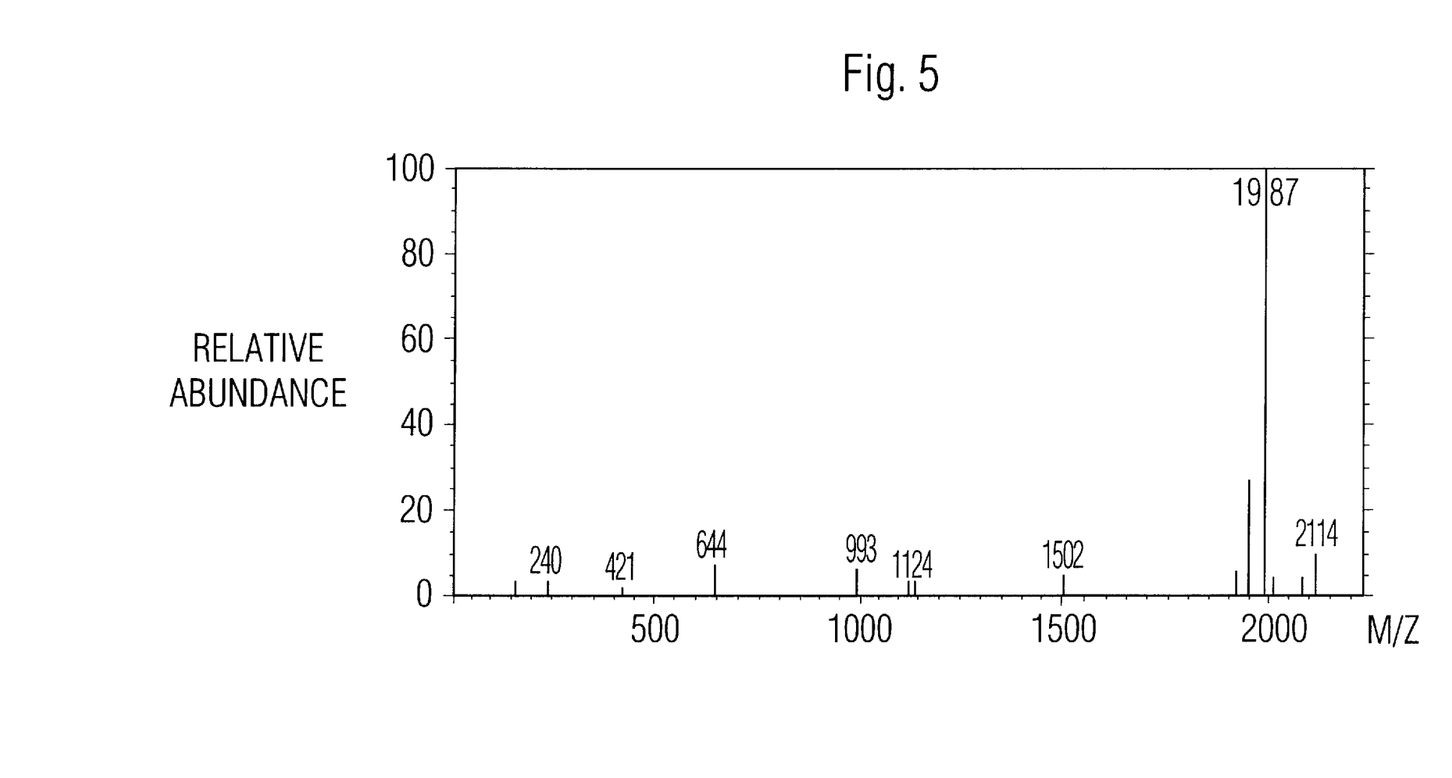
FIG. 5 is an FD-MS spectrum of the composition obtained in Example 5.

This powder was subjected to molecular weight determination by the FD-MS technique; the mass spectrum shown in FIG. 5 was obtained.

The mass spectrum of FIG. 5 identified a 6:4 type metal compound of the present invention (example monoazo metal compound (g)) [M/Z, 1987 (M$^+$)], which is the major reaction product, and very small amounts of a 3:2 type metal compound of the present invention (example monoazo compound (a)) [M/Z, 993 (M$^+$)] and a 2:1 type metal compound of the present invention ({[example monoazo compound (1)]$_2$(Cr)}$^-$.H$^+$) [M/Z 644 (M$^+$-1)].

Toner for developing electrostatic images

Next, a toner for developing electrostatic images whose charge control agent is based on a monoazo metal compound of the present invention (and also a composition of the present invention) is hereinafter described with reference to Examples A through C.

Example A

Styrene-acrylic copolymer resin [HIMER SMB600 (trade name), produced by Sanyo Kasei Co., Ltd.] . . . 100 parts
Low polymer polypropylene [Biscal 550P (trade name), produced by Sanyo Kasei Co., Ltd.] . . . 3 parts
Carbon Black [MA-100 (trade name), produced by Mitsubishi Chemical Industries, Ltd.] . . . 6 parts
Charge control agent (composition obtained in Example 1) . . . 1 part The above ingredients were uniformly pre-mixed using a high-speed mixer, and then kneaded in a molten state using a heat roll, cooled, and roughly milled in a vibration mill.

The obtained coarse product was finely pulverized using an air jet mill equipped with a classifier to yield a negatively chargeable toner 10 to 20 g m in particle size.

Five parts of this toner was admixed with 95 parts of an iron powder carrier [TEFV 200/300 (trade name), produced by Powdertech Co., Ltd.) to yield a developer.

The developer was thoroughly stirred and the amount of charges of the developer was determined by the blowoff method using a blowoff charge analyzer [TB-200 (trade name), produced by Toshiba Chemical Corporation); the amount of initial blowoff charges of the developer was found to be −29.7 $\mu$C/g. The amounts of initial blowoff charges of the developer under low-temperature low-humidity conditions and high-temperature high-humidity conditions were −29.0 $\mu$C/g and −28.8 $\mu$C/g, respectively, demonstrating very high stability; storage stability was also good.

When this developer was used for repeated cycles of actual imaging on a commercially available copying machine, high-quality images free of density reduction and fogging were obtained, with good charge stability and sustainability and no high-temperature offset phenomenon.

Example B

A toner according to the present invention and a developer were prepared and assessed in the same manner as in Example A, except that the charge control agent composition used in Example A was replaced with that obtained Example 2. The amount of initial blowoff charges of the developer was determined to be −21.3 μC/g. The amounts of initial blowoff charges of the developer under low-temperature low-humidity conditions and high-temperature high-humidity conditions were −21.5 μC/g and 31 20.0 μC/g, respectively, demonstrating very high stability; storage stability was also good. When this developer was used for repeated cycles of actual imaging in the same manner as in Example A, high-quality images free of density reduction and fogging were obtained, with good charge stability and sustainability and no high-temperature offset phenomenon, as in Example A.

Example C

Polyester resin [HP-301 (trade name), produced by The Nippon Synthetic Chemical Industry, Co., Ltd.] . . . 100 parts
Low polymer polypropylene [Biscal 550P (trade name), produced by Sanyo Kasei Co., Ltd.] . . . 2 parts
Carbon Black [MA-100 (trade name), produced by Mitsubishi Chemical Industries, Ltd.] . . . 6 parts
Charge control agent (composition obtained in Example 5) . . . 1 part The above ingredients were treated in the same manner as in Example A to yield a negatively chargeable toner, which was then used to prepare a developer.

When this developer was used for repeated cycles of actual imaging, high-quality images free of density reduction and fogging were obtained, with good charge stability and sustainability. The offset phenomenon was not noted.

Comparative Example 1

A toner and developer were prepared and assessed in the same manner as in Example A, except that the charge control agent used in Example A was replaced with a chromium complex compound of the following structure (Cr complex compound of the monoazo compound and t-butylsalicylic acid disclosed in Japanese Patent Unexamined Publication No. 29254/1984). The amount of charges and charge stability were problematic. When this developer was used for repeated cycles of actual imaging, image scattering, derangement, fogging and other drawbacks were noted.

Comparative Example 2

A toner and developer were prepared and assessed in the same manner as in Example A, except that the charge control agent used in Example A was replaced with an Mg complex compound of t-butylsalicyclic acid of the following structure (disclosed in Japanese Patent Unexamined Publication No. 163061/1987). The amount of charges and charge stability were problematic. When this developer was used for repeated cycles of actual imaging, image scattering, derangement, fogging and other drawbacks were noted; the charge control agent failed to exhibit satisfactory effect.

Powdery paints for electrostatic painting

Next, powdery paints for electrostatic painting whose charge enhancer is based on a monoazo metal compound of the present invention (and also a composition of the present invention) are described with reference to Examples D through G.

Although painting with the powdery paint of the present invention for electrostatic painting can be achieved using an ordinary method of electrostatic painting such as the corona charging method, frictional charging method or hybrid method, electrostatic painting by the frictional charging method is primarily described here.

As shown in Table 1, 97 to 98 parts of a resin for powdery paint, 2 to 3 parts of the charge enhancer composition obtained in Example 1, 3, 4 or 5, and 0 to 5 parts of a coloring agent were uniformly pre-mixed using a ball mill, and then kneaded in a molten state using a heat roll, cooled, and roughly and finely milled to yield a powdery paint for electrostatic painting of 20 to 250 μm in particle size.

When the powdery paints for electrostatic painting thus obtained were subjected to a painting test by the tribocharge method on a steel plate using a frictional charging electrostatic powdery painting machine [Tribomatic (trade name), produced by Nordson K. K.], painted products having good appearance and no painting film defects were obtained at a paint adhesion efficiency of not less than 96%.

TABLE 1

| Example | Powdery paint composition | Powdery paint | Paint |
|---|---|---|---|
| D | 97 parts of acrylic resin and 3 parts of charge enhancer obtained in Example 1 | Negatively chargeable | 99 |
| E | 98 parts of acrylic resin and 2 parts of charge enhancer obtained in Example 4 | Negatively chargeable | 98 |
| F | 97 parts of polyester resin and 3 parts of charge enhancer obtained in Example 5 | Negatively chargeable | 98 |
| G | 98 parts of acrylic resin and 2 parts of charge enhancer obtained in Example 3 | Negatively chargeable | 96 |

What is claimed is:

1. A toner for developing electrostatic images comprising a coloring agent, a resin and a monoazo metal compound represented by the formula [I] below as charge control agent

$$D_3(Met)_2 \qquad [I]$$

wherein D represents a ligand based on a monoazo compound having 2 metallizable —OH groups represented by formula [II] or [III] below, Met represents a metal atom, and the 3 molecules of D are coordinated to the 2 atoms of Met:

[II]

wherein $R^1$, $R^2$, $R^3$, $R^4$, $R^5$, $R^6$, $R^7$, $R^8$, $R^9$ and $R^{10}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —SO$_2$N(R$^{11}$)$_2$ (the two $R^{11}$ groups, whether identical or not, represent a hydrogen, a lower alkyl group, an aryl group having or not having nuclear substitution, or an aralkyl group having or not having nuclear substitution), —N(R$^{12}$)$_2$ (the two $R^{12}$ groups, whether identical or not, represent a hydrogen, a lower alkyl group, an aryl group having or not having nuclear substitution, an aralkyl group having or not having nuclear substitution, or an acyl group), or —CONH(R$^{13}$) (R$^{13}$ represents a hydrogen, a lower alkyl group, an aryl group having or not having nuclear substitution, or an aralkyl group having or not having nuclear substitution); 2 or more of $R^1$ through $R^{10}$ may bind together to form an aromatic or aliphatic ring;

[III]

wherein $R^{21}$, $R^{22}$, $R^{23}$, $R^{24}$, $R^{25}$, $R^{26}$, $R^{27}$ and $R^{28}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —SO$_2$N(R$^{29}$)$_2$ (the two $R^{29}$ groups, whether identical or not, represent a hydrogen, a lower alkyl group, an aryl group having or not having nuclear substitution, or an aralkyl group having or not having nuclear substitution), —N(R$^{30}$)$_2$ (the two $R^{30}$ groups, whether identical or not, represent a hydrogen, a lower alkyl group, an aryl group having or not having nuclear substitution, an aralkyl group having or not having nuclear substitution, or an acyl group), or —CONH(R$^{31}$) (R$^{31}$ represents a hydrogen, a lower alkyl group, an aryl group having or not having nuclear substitution, or an aralkyl group having or not having nuclear substitution); 2 or more of $R^{21}$ through $R^{28}$ may bind together to form an aromatic or aliphatic ring.

2. A toner for developing electrostatic images comprising a coloring agent, a resin and a monoazo metal compound represented by the formula [IV] below as charge control agent

$$D_6(Met)_4 \qquad [IV]$$

wherein D represents a ligand based on a monoazo compound having 2 metallizable —OH groups represented by formula [II] or [III] below, Met represents a metal atom, and the 6 molecules of D are coordinated to the 4 atoms of Met:

[II]

wherein $R^1$, $R^2$, $R^3$, $R^4$, $R^5$, $R^6$, $R^7$, $R^8$, $R^9$ and $R^{10}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —SO$_2$N(R$^{11}$)$_2$ (the two $R^{11}$ groups, whether identical or not, represent a hydrogen, a lower alkyl group, an aryl group having or not having nuclear substitution, or an aralkyl group having or not having nuclear substitution), —N(R$^{12}$)$_2$ (the two $R^{12}$ groups, whether identical or not, represent a hydrogen, a lower alkyl group, an aryl group having or not having nuclear substitution, an aralkyl group having or not having nuclear substitution, or an acyl group), or —CONH(R$^{13}$) (R$^{13}$ represents a hydrogen, a lower alkyl group, an aryl group having or not having nuclear substitution, or an aralkyl group having or not having nuclear substitution); 2 or more of $R^1$ through $R^{10}$ may bind together to form an aromatic or aliphatic ring;

[III]

wherein $R^{21}$, $R^{22}$, $R^{23}$, $R^{24}$, $R^{25}$, $R^{26}$, $R^{27}$ and $R^{28}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —SO$_2$N(R$^{29}$)$_2$ (the two R$^{29}$ groups, whether identical or not, represent a hydrogen, a lower alkyl group, an aryl group having or not having nuclear substitution, or an aralkyl group having or not having nuclear substitution), —N(R$^{30}$)$_2$ (the two R$^{30}$ groups, whether identical or not, represent a hydrogen, a lower alkyl group, an aryl group having or not having nuclear substitution, an aralkyl group having or not having nuclear substitution, or an acyl group), or —CONH(R$^{31}$) (R$^{31}$ represents a hydrogen, a lower alkyl group, an aryl group having or not having nuclear substitution, or an aralkyl group having or not having nuclear substitution); 2 or more of R$^{21}$ through R$^{28}$ may bind together to form an aromatic or aliphatic ring.

3. The toner for developing electrostatic images of claim 1 wherein R$^5$ is a hydrogen or an amide group represented by formula [V] below

[V]

wherein (R$^{14}$)$_{0-2}$ means 0 to 2 substituents; R$^{14}$ represents a halogen, a lower alkyl group, or a lower alkoxy group.

4. The toner for developing electrostatic images of claim 2 wherein R$^5$ is a hydrogen or an amide group represented by formula [V] below

[V]

wherein (R$^{14}$)$_{0-2}$ means 0 to 2 substituents; R$^{14}$ represents a halogen, a lower alkyl group, or a lower alkoxy group.

5. The toner for developing electrostatic images of claim 1 wherein said metal atom (Met) is trivalent chromium or trivalent iron.

6. The toner for developing electrostatic images of claim 2 wherein said metal atom (Met) is trivalent chromium or trivalent iron.

7. A toner for developing electrostatic images comprising a coloring agent, a resin and a composition as charge control agent comprising 2 or 3 monoazo metal compounds selected from the group consisting of monoazo metal compounds represented by formula [VI] below, monoazo metal compounds represented by formula [VII] below, and monoazo metal compounds represented by formula [VIII] below

[VI]

[VII]

[VIII]

in formulas [VI], [VII] and [VIII], R$^1$, R$^2$, R$^3$, R$^4$, R$^5$, R$^6$, R$^7$, R$^8$, R$^9$ and R$^{10}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —SO$_2$N(R$^{11}$)$_2$ (the two R$^{11}$ groups, whether identical or not, represent a hydrogen, a lower alkyl group, an aryl group having or not having nuclear substitution, or an aralkyl group having or not having nuclear substitution), —N(R$^{12}$)$_2$ (the two R$^{12}$ groups, whether identical or not, represent a hydrogen, a lower alkyl group, an aryl group having or not having nuclear substitution, an aralkyl group having or not having nuclear substitution, or an acyl group), or —CONH(R$^{13}$) (R$^{13}$ represents a hydrogen, a lower alkyl group, an aryl group having or not having nuclear substitution, or an aralkyl group having or not having nuclear substitution); 2 or more of R$^1$ through R$^{10}$ may bind together to form an aromatic or aliphatic ring; Met represents a metal atom; and in formula [VIII], A$^+$ represents a cation.

8. The toner for developing electrostatic images of claim 7 wherein R$^5$ is a hydrogen or an amide group represented by formula [V] below.

[V]

wherein (R$^{14}$)$_{0-2}$ means 0 to 2 substituents; R$^{14}$ represents a halogen, a lower alkyl group, or a lower alkoxy group.

9. A toner for developing electrostatic images comprising a coloring agent, a resin and a composition as charge control agent comprising 2 or 3 monoazo metal compounds selected from the group consisting of monoazo metal compounds represented by formula [IX] below, monoazo metal compounds represented by formula [X] below, and monoazo metal compounds represented by formula [XI] below In formulas [IX], [X] and [XI], $R^{21}$, $R^{22}$, $R^{23}$, $R^{24}$, $R^{25}$, $R^{26}$, $R^{27}$ and $R^{28}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{29})_2$ (the two $R^{29}$ groups, whether identical or not, represent a hydrogen, a lower alkyl group, an aryl group having or not having nuclear substitution, or an aralkyl group having or not having nuclear substitution), —$N(R^{30})_2$ (the two $R^{30}$ groups, whether identical or not, represent a hydrogen, a lower alkyl group, an aryl group having or not having nuclear substitution, an aralkyl group having or not having nuclear substitution, or an acyl group), or —$CONH(R^{31})$ ($R^{31}$ represents a hydrogen, a lower alkyl group, an aryl group having or not having nuclear substitution, or an aralkyl group having or not having nuclear substitution); 2 or more of $R^{21}$ through $R^{28}$ may bind together to form an aromatic or aliphatic ring; Met represents a metal atom; and in formula [XI], $A^+$ represents a cation.

10. A powdery paint for electrostatic painting comprising a resin and a monoazo metal compound as charge enhancer represented by the formula [I] below $$D_3(Met)_2 \qquad [I]$$

wherein D represents a ligand based on a monoazo compound having 2 metallizable —OH groups represented by formula [II] or [III] below, Met represents a metal atom, and the 3 molecules of D are coordinated to the 2 atoms of Met wherein $R^1$, $R^2$, $R^3$, $R^4$, $R^5$, $R^6$, $R^7$, $R^8$, $R^9$ and $R^{10}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{11})_2$ (the two $R^{11}$ groups, whether identical or not, represent a hydrogen, a lower alkyl group, an aryl group having or not having nuclear substitution, or an aralkyl group having or not having nuclear substitution), —$N(R^{12})_2$ (the two $R^{12}$ groups, whether identical or not, represent a hydrogen, a lower alkyl group, an aryl group having or not having nuclear substitution, an aralkyl group having or not having nuclear substitution, or an acyl group), or —$CONH(R^{13})$ ($R^{13}$ represents a hydrogen, a lower alkyl group, an aryl group having or not having nuclear substitution, or an aralkyl group having or not having nuclear substitution); 2 or more of $R^1$ through $R^{10}$ may bind together to form an aromatic or aliphatic ring wherein $R^{21}$, $R^{22}$, $R^{23}$, $R^{24}$, $R^{25}$, $R^{26}$, $R^{27}$ and $R^{28}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{29})_2$ (the two $R^{29}$ groups, whether identical or not, represent a hydrogen, a lower alkyl group, an aryl group having or not having nuclear substitution, or an aralkyl group having or not having nuclear substitution), —$N(R_{30})_2$ (the two $R^{30}$ groups, whether identical or not, represent a hydrogen, a lower alkyl group, an aryl group having or not having nuclear substitution, an aralkyl group having or not having nuclear substitution, or an acyl group), or —$CONH(R^{31})$ ($R^{31}$ represents a hydrogen, a lower alkyl group, an aryl group having or not having nuclear substitution, or an aralkyl group having or not having nuclear substitution); 2 or more of $R^{21}$ through $R^{28}$ may bind together to form an aromatic or aliphatic ring.

11. A powdery paint for electrostatic painting comprising a resin and a monoazo metal compound as charge enhancer represented by the formula [IV] below $$D_6(Met)_4 \qquad [IV]$$

wherein D represents a ligand based on a monoazo compound having 2 metallizable —OH groups represented by formula [II] or [III] below, Met represents a metal atom, and the 6 molecules of D are coordinated to the 4 atoms of Met

[II]

[III]

wherein $R^1$, $R^2$, $R^3$, $R^4$, $R^5$, $R^6$, $R^7$, $R^8$, $R^9$ and $R^{10}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{11})_2$ (the two $R^{11}$ groups, whether identical or not, represent a hydrogen, a lower alkyl group, an aryl group having or not having nuclear substitution, or an aralkyl group having or not having nuclear substitution), —$N(R^{12})_2$ (the two $R^{12}$ groups, whether identical or not, represent a hydrogen, a lower alkyl group, an aryl group having or not having nuclear substitution, an aralkyl group having or not having nuclear substitution, or an acyl group), or —$CONH(R^{13})$ ($R^{13}$ represents a hydrogen, a lower alkyl group, an aryl group having or not having nuclear substitution, or an aralkyl group having or not having nuclear substitution); 2 or more of $R^1$ through $R^{10}$ may bind together to form an aromatic or aliphatic ring wherein $R^{21}$, $R^{22}$, $R^{23}$, $R^{24}$, $R^{25}$, $R^{26}$, $R^{27}$ and $R^{28}$ independently represent a hydrogen, a halogen, a nitro group, an alkyl or haloalkyl group having 1 to 20 carbon atoms, an aryl group having or not having nuclear substitution, an aralkyl group having or not having nuclear substitution, —$SO_2N(R^{29})_2$ (the two $R^{29}$ groups, whether identical or not, represent a hydrogen, a lower alkyl group, an aryl group having or not having nuclear substitution, or an aralkyl group having or not having nuclear substitution), —$N(R^{30})_2$ (the two $R^{30}$ groups, whether identical or not, represent a hydrogen, a lower alkyl group, an aryl group having or not having nuclear substitution, an aralkyl group having or not having nuclear substitution, or an acyl group), or —$CONH(R^{31})$ ($R^{31}$ represents a hydrogen, a lower alkyl group, an aryl group having or not having nuclear substitution, or an aralkyl group having or not having nuclear substitution); 2 or more of $R^{21}$ through $R^{28}$ may bind together to form an aromatic or aliphatic ring.

* * * * *